(12) United States Patent (10) Patent No.: US 9,090,265 B2
Yousuf (45) Date of Patent: Jul. 28, 2015

(54) ACTIVE SAFETY SYSTEMS OF VEHICLES WITH GRAPHICAL MICROPROCESSORS

(75) Inventor: Mohammed Abdulla Yousuf, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 13/596,239

(22) Filed: Aug. 28, 2012

(65) Prior Publication Data

US 2014/0067192 A1 Mar. 6, 2014

(51) Int. Cl.
*G06F 11/30* (2006.01)
*B60W 50/029* (2012.01)
*B60W 50/00* (2006.01)

(52) U.S. Cl.
CPC ..... *B60W 50/029* (2013.01); *B60W 2050/0005* (2013.01); *B60W 2050/0006* (2013.01)

(58) Field of Classification Search
CPC .... B60W 50/04; G05B 23/00; G05B 23/0235
See application file for complete search history.

(56) References Cited

U.S. PATENT DOCUMENTS

| 6,981,176 | B2 * | 12/2005 | Fruehling et al. | 714/11 |
|---|---|---|---|---|
| 7,865,770 | B2 * | 1/2011 | Quach | 714/11 |
| 7,920,071 | B2 * | 4/2011 | Baillot | 340/937 |
| 8,155,824 | B2 * | 4/2012 | Sakai et al. | 701/34.3 |
| 8,244,426 | B2 | 8/2012 | Buur et al. | 701/29.2 |
| 8,364,975 | B2 | 1/2013 | Kumar et al. | 713/189 |
| 8,375,243 | B1 * | 2/2013 | Lutter | 714/1 |
| 8,718,876 | B2 * | 5/2014 | Matsumura et al. | 701/45 |
| 2008/0208402 | A1 * | 8/2008 | Vhasure et al. | 701/22 |
| 2010/0211770 | A1 | 8/2010 | Alrabady et al. | 713/150 |
| 2012/0041636 | A1 | 2/2012 | Johnson et al. | 701/31.4 |
| 2013/0166244 | A1 * | 6/2013 | Turgeon | 702/117 |

OTHER PUBLICATIONS

ARM Cortex-A9 Processor specification sheet, Aug. 5, 2011 (http://www.arm.com/products/processors/cortex-a/cortex-a9.php).*
ARM Synchronization Primitives Development Article, 2009.*
U.S. Appl. No. 13/596,250, filed Aug. 28, 2012, Yousuf.

* cited by examiner

*Primary Examiner* — John Q Nguyen
*Assistant Examiner* — Alan D Hutchinson

(57) ABSTRACT

A system of a vehicle includes an engine control module (ECM), a first processor module, sensors, a second processor module, and a third processor module. The ECM controls engine actuators based on driver inputs to a steering wheel, an accelerator pedal, a brake pedal, and a cruise control system. The first processor module includes a first microprocessor and selectively actuates at least one of an electric power steering motor, friction brakes, and a throttle valve based on processed data. The sensors sense features outside of the vehicle. The second processor module includes a second microprocessor and generates the processed data based on data from the sensors. The second microprocessor is a graphical microprocessor. The third processor module includes a third microprocessor and generates an indicator of whether a fault is present in the second processor module.

18 Claims, 3 Drawing Sheets

ACTIVE SAFETY SYSTEMS OF VEHICLES WITH GRAPHICAL MICROPROCESSORS

CROSS-REFERENCE TO RELATED APPLICATIONS

This application is related to U.S. patent application Ser. No. 13/596,250 filed on Aug. 28, 2012. The disclosure of the above application is incorporated herein by reference in its entirety.

FIELD

The present disclosure relates to vehicle control systems and more specifically to active safety systems of vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes a plurality of systems, such as a powertrain system, a brake system, a fuel system, etc. Each system includes a plurality of hardware components and safety mechanisms. A safety mechanism may be a physical safety mechanism or a piece of software executed by a processor to act as a safety mechanism. A safety mechanism for a hardware component may perform a remedial action to provide a level of safety if the hardware component fails.

Systems of electrical components of the vehicle may be required to comply with one or more automotive hardware integrity requirements, such as standard 26262 of the International Organization for Standardization (ISO). For example only, a hazard that could occur when one or more elements of a system fail may be required to have a probability of occurrence that is less than a predetermined probability to comply with the ISO 26262 standard.

SUMMARY

A system of a vehicle includes an engine control module (ECM), a first processor module, sensors, a second processor module, and a third processor module. The ECM controls engine actuators based on driver inputs to a steering wheel, an accelerator pedal, a brake pedal, and a cruise control system. The first processor module includes a first microprocessor and selectively actuates at least one of an electric power steering motor, friction brakes, and a throttle valve based on processed data. The sensors sense features outside of the vehicle. The second processor module includes a second microprocessor and generates the processed data based on data from the sensors. The second microprocessor is a graphical microprocessor. The third processor module includes a third microprocessor and generates an indicator of whether a fault is present in the second processor module.

In other features, the first microprocessor includes at least two processor cores, and the second microprocessor includes at least four processor cores.

In still other features, the second microprocessor operates at a speed of at least 1 Gigahertz (GHz).

In further features, the second microprocessor includes a rating of at least 9600 Dhrystone million instructions per second (DMIPS).

In still further features, the third processor module determines whether the fault is present in the second processor module based on whether the second processor module calls functions in a predetermined order.

In other features, the third processor module determines that the fault is present in the second processor module when the second processor module calls functions in an order that is different than the predetermined order.

In still other features, the third processor module determines whether the fault is present in the second processor module based on whether the second processor module completes execution of a function within a predetermined period.

In further features, the third processor module determines that the fault is present in the second processor module when the second processor module one of completes execution of the function in greater than the predetermined period and does not complete the execution of the function.

In still further features, the third processor module outputs a challenge to the second processor module and determines whether the fault is present in the second processor module based on whether the second processor module generates a predetermined response to the challenge.

In other features, the third processor module determines that the fault is present in the second processor module when the third processor module generates a response that is different than the predetermined response.

In still other features, the second microprocessor includes at least four processor cores, and the third processor module determines that the fault is present in the second processor module when the at least four processor cores are not synchronized.

In further features, the third processor module generates a challenge, the second microprocessor includes at least four processor cores, a first processor core of the at least four processor cores generates a first result based on the challenge, a second processor core of the at least four processor cores generates a second result based on the challenge, and a third processor core of the at least four processor cores compares the first and second results. The first, second, and third processor cores are different cores.

In still further features, the third processor core indicates whether the first and second results are the same, and the third processor module determines whether the fault is present in the second processor module based on the indication of whether the first and second results are the same.

In other features, the third processor module determines that the fault is present in the second processor module when the third processor core indicates that the first and second results are not the same.

In still other features, the system further includes an external object calculation module that includes: a fourth processor module that includes a fourth microprocessor and that selectively actuates at least one of the electric power steering motor, the friction brakes, and the throttle valve based on second processed data; a fifth processor module that includes a fifth microprocessor and that generates the second processed data based on the data from the sensors; and a sixth processor module that includes a sixth microprocessor and that generates an indicator of whether a fault is present in the fifth processor module. The fifth microprocessor is the same as the graphical microprocessor.

In further features, the fourth microprocessor includes at least two processor cores, and the fifth microprocessor includes at least four processor cores.

In still further features, the fifth microprocessor operates at a speed of at least 1 Gigahertz (GHz).

In other features, the fifth microprocessor includes a rating of at least 9600 Dhrystone million instructions per second (DMIPS).

In still other features, when the fault is present in the second processor module, the third processor module prevents the first processor module from actuating the electric power steering motor, the friction brakes, and the throttle valve.

In further features, only in response to an indication that the fault is present in the first processor module, the fourth processor module actuates at least one of the electric power steering motor, the friction brakes, and the throttle valve based on the second processed data.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A vehicle may include one or more active safety systems that selectively control one or more actuators of the vehicle. Active safety systems include systems that adjust one or more of vehicle steering, vehicle braking, and vehicle acceleration/deceleration. Vehicle steering, vehicle braking, and vehicle acceleration/deceleration are generally controlled based on input from a driver. Active safety systems are systems that selectively adjust vehicle steering, vehicle braking, and/or vehicle acceleration/deceleration to supplement driver input, to counteract driver input, or independent of driver input. Active safety systems may also be referred to as safety critical embedded control (SCEC) systems and semi-autonomous driving systems.

For example, a vehicle may include an active safety system that selectively adjusts vehicle steering, for example, to position (e.g., center) a vehicle within a lane, to change lanes, object avoidance, and/or for one or more other reasons. A vehicle may additionally or alternatively include an active safety system that selectively adjusts vehicle braking and/or vehicle acceleration/deceleration, for example, for collision avoidance, adaptive cruise control, collision preparation, and/or one or more other reasons.

A vehicle manufacturer develops a preliminary report for a vehicle before the vehicle is made available for sale to the public. The preliminary report may indicate a hazard that could occur when one or more elements of a system of the vehicle fail. A classification for the system may be defined by an automotive hardware integrity standard, such as standard 26262 generated by the International Organization for Standardization (ISO). For example, active safety systems may be classified within automotive safety integrity level (ASIL) D of the ISO 26262 standard.

Automotive grade microprocessors have been specifically designed for compliance with one or more of the ASIL classifications of the ISO 26262 standard. An active safety system may include one automotive grade microprocessor that performs the processing for and operation of the active safety system. By itself, however, the one automotive grade microprocessor could not achieve one or more requirements of the ASIL D classification. Additionally, automotive grade microprocessors are costly and large, and implementing a plurality (e.g., three) of the automotive grade microprocessors along with the associated functionality of an active safety system may be complex to comply with the ASIL D classification.

The present disclosure describes active safety systems that include an automotive grade microprocessor and at least one graphical microprocessor. Graphical microprocessors are typically used in processing intensive, embedded systems with one or more displays, such as smart phones, tablet computers, navigation systems, etc. Graphical microprocessors are not used in active safety systems because of their non-compliance with the ASIL classifications.

Figure 1:
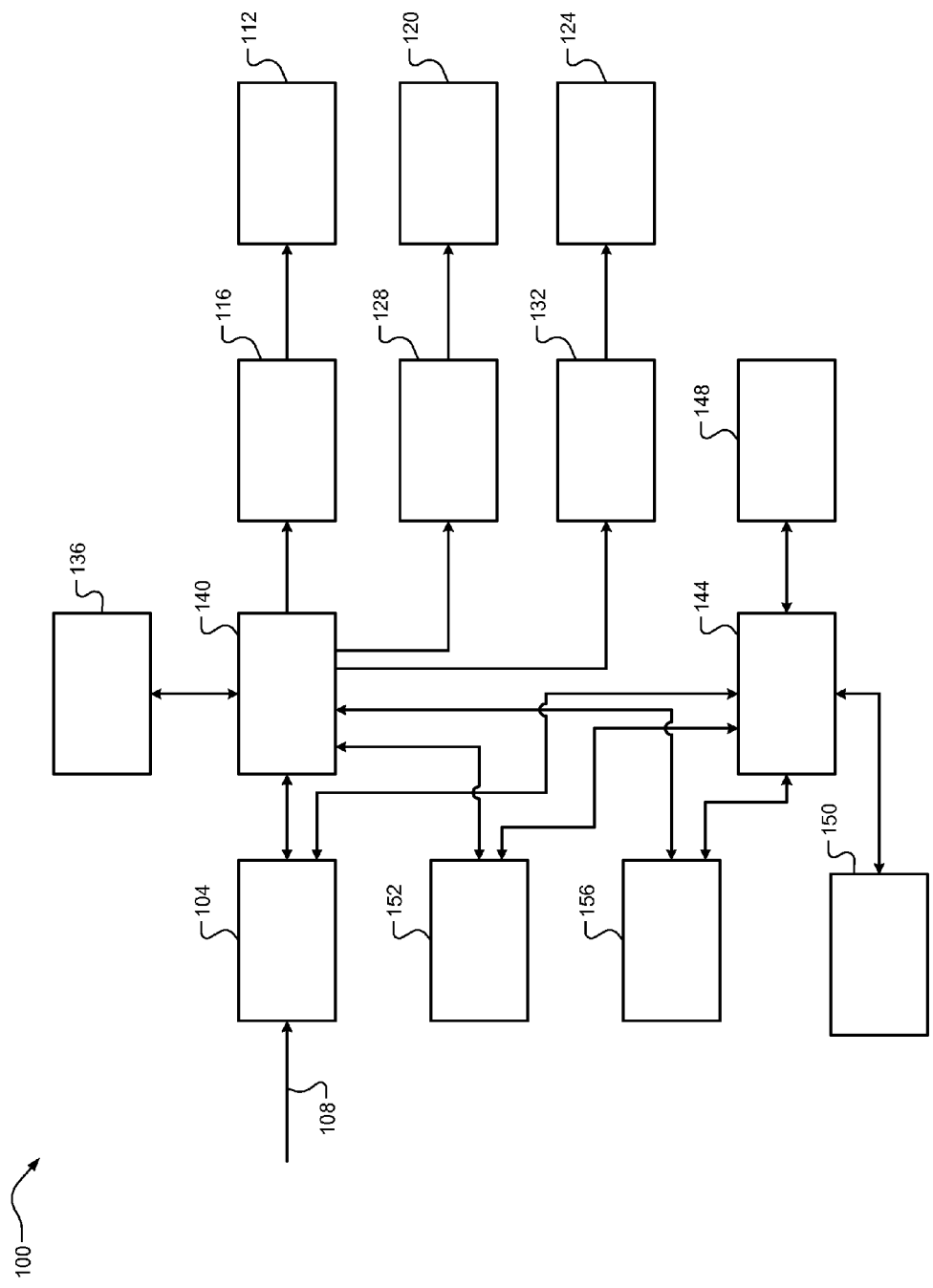
FIG. 1 is a functional block diagram of an example vehicle system according to the present application.

Referring now to FIG. 1, a functional block diagram of a vehicle system 100 including an active safety system is presented. An engine control module (ECM) 104 controls engine actuators based on one or more driver inputs 108. The driver inputs 108 may include accelerator pedal position (APP), brake pedal position (BPP), steering wheel position (also called steering angle), cruise control inputs, and other driver inputs.

The ECM 104 may, for example, determine a desired opening of a throttle valve 112 based on one or more of the driver inputs 108. A throttle actuator module 116 may actuate the throttle valve 112 based on the desired opening. While not shown, other engine actuators include, but are not limited to, fuel injectors, spark plugs, exhaust gas recirculation (EGR) valves, boost devices, valve actuators and/or phasers, etc.

The ECM 104 may also control one or more other actuators based on one or more of the driver inputs 108, such as a power steering motor 120 and (friction) brakes 124. The ECM 104 may, for example, determine a desired steering angle based on the steering wheel position and determine a desired braking force based on the BPP. A steering actuator module 128 may actuate the power steering motor 120 based on the desired steering angle. A brake actuator module 132 may actuate the brakes 124 based on the desired braking force.

In addition to or as an alternative to the driver inputs 108, the ECM 104 may control one or more of the actuators based on one or more parameters measured by sensors 136. The sensors 136 may include, for example, an intake air temperature sensor, a mass air flowrate (MAF) sensor, a manifold pressure sensor, oil and coolant temperature sensors, wheel speed sensors, and various other temperature, position, pressure, and speed sensors.

The ECM 104 and other modules of the vehicle may transmit and receive data via one or more car area network (CAN) busses, such as CAN bus 140. The ECM 104 and other modules of the vehicle may additionally or alternatively transmit and receive data via one or more other data busses, such as FlexRay bus 144. The FlexRay bus 144 is a data bus where communication is performed according to a FlexRay communication protocol.

Data from sensors 148 that can be used to determine relationships between the vehicle and features outside of the vehicle may be received via the FlexRay bus 144. Data from other things, such as a global positioning system (GPS) 150, may also be received via the FlexRay bus 144 or another suitable bus. The GPS 150 determines a location of the vehicle. The sensors 148 may include, for example, one or more Lidar (light detection and ranging) sensors, one or more radar based sensors, one or more laser based sensors, optical sensors, one or more cameras, and/or one or more other sensors that can be used to determine relationships between the vehicle and features (e.g., lanes, objects, etc.) outside of (i.e., that are external to) the vehicle.

The vehicle may include one or more active safety systems that selectively control one or more of vehicle steering, vehicle braking, and vehicle acceleration/deceleration based on one or more measured parameters to supplement the driver inputs 108, to counteract the driver inputs 108, or independent of the driver inputs 108. One example active safety system selectively adjusts vehicle steering via the power steering motor 120, for example, to position (e.g., center) a vehicle within a lane, to change lanes, object avoidance, and/or for one or more other reasons. Another example active safety system selectively adjusts vehicle braking via the brakes 124 and/or vehicle acceleration/deceleration via the throttle valve 112, for example, for collision avoidance, adaptive cruise control, collision preparation, and/or for one or more other reasons.

An active safety system is a system that selectively actuates the throttle valve 112, the power steering motor 120, and/or the brakes 124, to supplement the driver inputs 108, to counteract the driver inputs 108, or independent of the driver inputs 108. The example active safety system includes a primary external object calculating module (EOCM) 152. The primary EOCM 152 (see also FIG. 2) selectively actuates the throttle valve 112, the power steering motor 120, and/or the brakes 124 to supplement the driver inputs 108, to counteract the driver inputs 108, or independent of the driver inputs 108.

The example active safety system also includes a redundant EOCM 156. The redundant EOCM 156 is identical to the primary EOCM 152. In the event that a fault is detected in the primary EOCM 152, control is transferred from the primary EOCM 152 to the redundant EOCM 156, and the redundant EOCM 156 selectively actuates the throttle valve 112, the power steering motor 120, and/or the brakes 124. As the primary and redundant EOCMs 152 and 156 are identical, only the primary EOCM 152 will be discussed.

Figure 2:
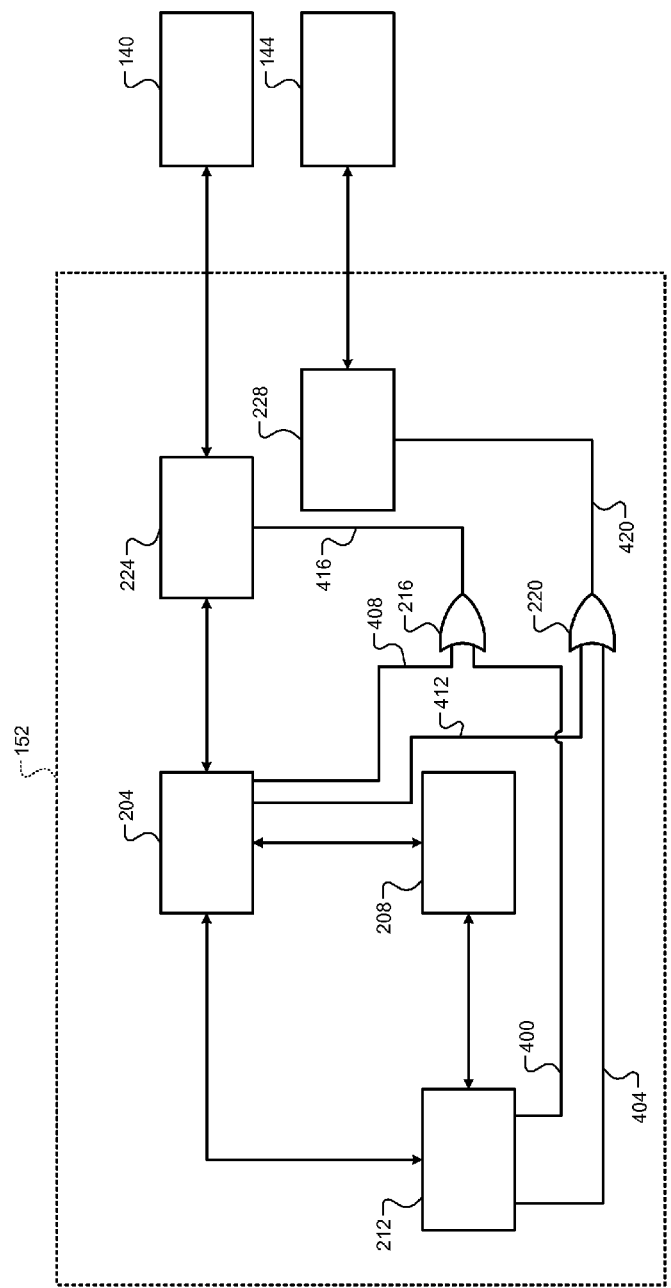
FIG. 2 is a functional block diagram of an example external object calculation module according to the present application.
Figure 3:
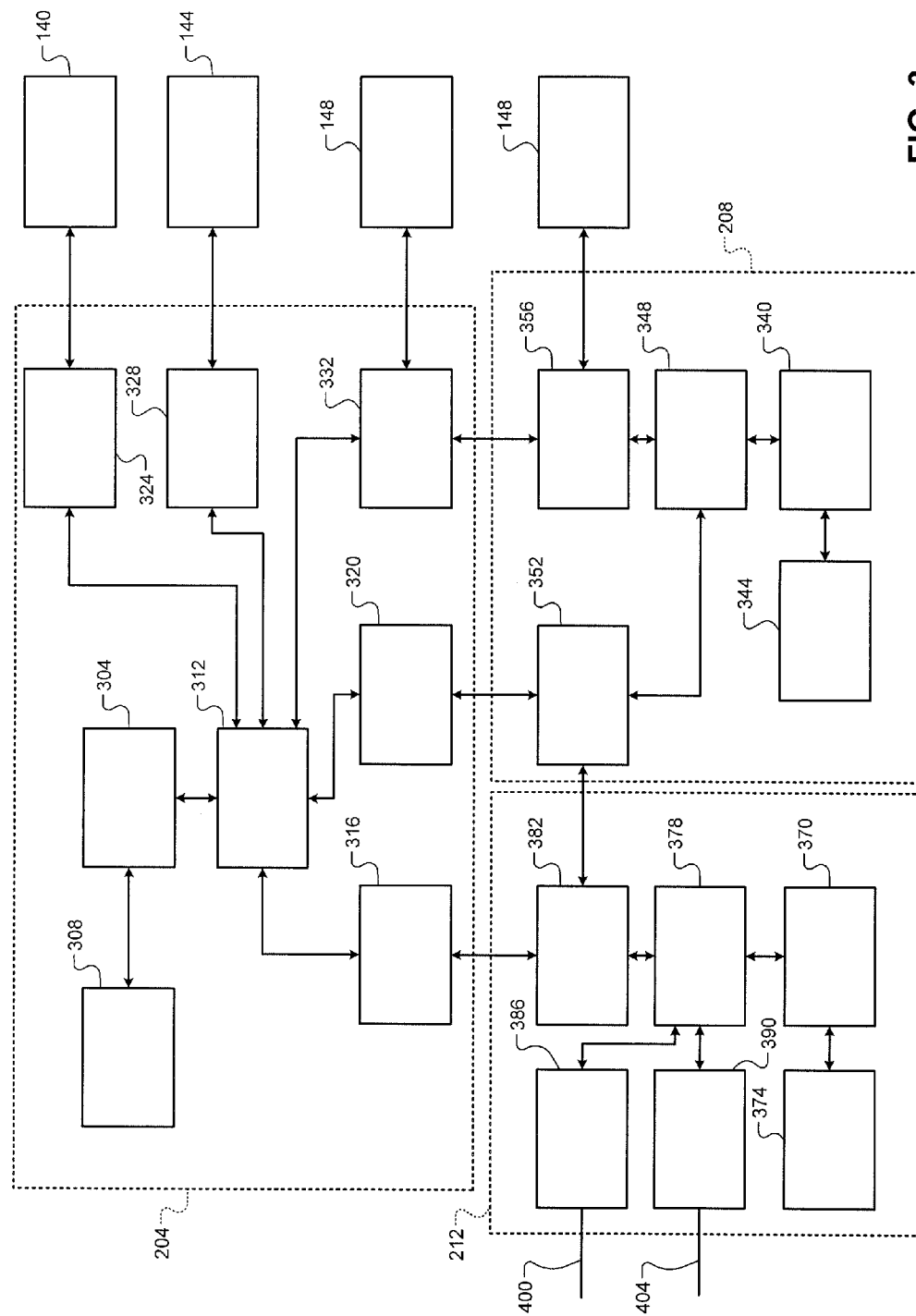
FIG. 3 is a functional block diagram of example processor modules of the external object calculation module according to the present application.

Referring now to FIG. 2, a functional block diagram of the primary EOCM 152 is presented. The primary EOCM 152 includes a first processor module 204, a second processor module 208, a third processor module 212, a CAN bus disabling module 216, a FlexRay bus disabling module 220, a CAN transceiver 224, and a FlexRay transceiver 228. FIG. 3 includes functional block diagrams of the first processor module 204, the second processor module 208, and the third processor module 212.

Referring now to FIGS. 2 and 3, the first processor module 204 includes a processor 304, memory 308, common resources 312, a first serial packet interface (SPI) 316, and a second SPI 320. The first processor module 204 also includes a CAN transceiver 324, a FlexRay transceiver 328, and an Ethernet transceiver 332. The memory 308 may include, for example, external random access memory (RAM), external electrically erasable programmable read only memory (EEPROM), and/or other suitable types of memory.

The first processor module 204 is an automotive grade processor module, such as a Kimodo manufactured by Freescale. The first processor module 204 satisfies each of the following minimum characteristics:
Dual-core, 180 Megahertz (MHz) microprocessor;
900 Dhrystone million instructions per second (DMIPS);
1 Megabytes (MB) of flash memory; and
0.5 MB of RAM.

The first processor module 204 receives data from the sensors 136 via the CAN transceiver 324. The first processor module 204 transmits data to the CAN buses and receives data from the CAN buses via the CAN transceiver 324. The first processor module 204 transmits data to the FlexRay bus 144 and receives data from the FlexRay bus 144 via the FlexRay transceiver 328. The first processor module 204 may receive data from one or more of the sensors 148 via the FlexRay transceiver 328.

The first processor module 204 may receive data from one or more of the sensors 148 via the Ethernet transceiver 332. The first processor module 204 may receive the location of the vehicle via the CAN transceiver 324, the FlexRay transceiver 328, the Ethernet transceiver 332, or in another suitable manner. The first processor module 204 transmits data to the second processor module 208 and receives data from the second processor module 208 via the Ethernet transceiver 332. For example, the first processor module 204 may transmit data received from sensors (e.g., the sensors 136 and/or the sensors 148) and/or the GPS 150 to the second processor module 208 via the Ethernet transceiver 332. The first processor module 204 also transmits data to the second processor module 208 and receives data from the second processor module 208 via the second SPI 320. For example, the first processor module 204 may transmit data received from sensors (e.g., the sensors 136 and/or the sensors 148) and/or the GPS 150 to the second processor module 208 via the second SPI 320. The first processor module 204 transmits data to the third processor module 212 and receives data from the third processor module 212 via the first SPI 316.

The second processor module 208 includes a processor 340, memory 344, common resources 348, an SPI 352, and an Ethernet transceiver 356. The memory 344 may include, for example, RAM, Flash, and/or other suitable types of memory. The second processor module 208 includes a graphical microprocessor, such as a Cortex-A9 manufactured by ARM or an Integra 4 manufactured by Nvidia. The second processor module 208 satisfies each of the following minimum characteristics:
Quad-core, 1 Gigahertz (GHz) microprocessor;
9600 DMIPS;
10 MB Flash memory and ROM;
0.5 Gigabytes (GB) RAM;
a temperature monitor;
a watchdog; and
a clock and reset.

The second processor module 208 is lightly embedded in the active safety system. Lightly embedded may mean that the second processor module 208 is not used in hard-time systems and a response time of one second or more is acceptable. By way of contrast, the first processor module 204 is embedded, which may mean that response times of greater than one second are not acceptable and even response times that are less than one second may not be acceptable.

The second processor module 208 may receive data from one or more of the sensors 148 via the Ethernet transceiver 356. The second processor module 208 transmits data to the first processor module 204 and receives data from the first processor module 204 via the Ethernet transceiver 356. The second processor module 208 also transmits data to the first processor module 204 and receives data from the first processor module 204 via the SPI 352. The second processor module transmits data to the third processor module 212 and receives data from the third processor module 212 via the SPI 352.

The third processor module 212 includes a processor 370, memory 374, common resources 378, an SPI 382, a CAN bus transceiver 386, and a FlexRay transceiver 390. The third processor module 212 transmits data to the first processor module 204 and receives data from the first processor module 204 via the SPI 382. The third processor module 212 also transmits data to the second processor module 208 and receives data from the second processor module 208 via the SPI 382.

The second processor module 208 processes data from the sensors, such as the sensors 136 and 148. For example, based on received data from the sensors 148 and the GPS 150, the second processor module 208 may perform the processing intensive functions, such as identifying lane lines, determining a relationship between the vehicle and the lane lines (e.g., position of the vehicle between the lane lines), identifying objects that are outside of the vehicle, determining relationships between the vehicle and identified objects, determining shapes and sizes of the objects, determining a target path of the vehicle, determining an actual path of the vehicle, determining obstacles in a path of the vehicle, etc.

The first processor module 204 determines whether to actuate the throttle valve 112, the power steering motor 120, and/or the brakes 124 based on data resulting from the processing performed by the second processor module 208. When it is decided that the throttle valve 112, the power steering motor 120, and/or the brakes 124 should be actuated, the first processor module 204 determines the extent of the actuation, the rate at which the actuation should be performed, the length (period) of the actuation, etc. The first processor module 204 outputs commands to the actuator module(s) accordingly. The first processor module 204 may output commands to the actuator module(s), respectively, to supplement desired values determined based on the driver inputs 108, to counteract desired values determined based on the driver inputs 108, or independently of the driver inputs 108. In this manner, the first processor module 204 may provide semi-autonomous driving.

The third processor module 212 performs various functions to bring the safety integrity level of the second processor module 208 into compliance with the ASIL B standard. Based on the safety integrity level of the second processor module 208 (ASIL B) and the safety integrity level of the first processor module 204, the primary EOCM 152 will have a safety integrity level of ASIL D.

For example, the third processor module 212 verifies that the second processor module 208 calls functions in a predefined order and verifies that the second processor module 208 completes each function within a predetermined period. The third processor module 212 also ensures that the data from the sensors that is being processed by the second processor module 208 is the same as the data that is or may be being used by one or more other modules. This may be referred to as frame counting.

The third processor module 212 also verifies that the second processor module 208 is healthy. Verifying that the second processor module 208 is healthy may include sending a challenge (e.g., seed or token) to the second processor module 208 and verifying that a response of the second processor module 208 determined from the challenge is the same as an expected response. Verifying that the second processor module 208 is healthy may also include prompting the second processor module 208 to report that it is healthy. The third processor module 212 may also verify that the first processor module 204 is healthy, the first processor module 204 may also verify that the third processor module 212 is healthy, and/or the second processor module 208 may verify that the third processor module 212 is healthy.

The third processor module 212 may also verify that the second processor module 208 times out for less than a predetermined period in response to a prompt from the third processor module 212. The third processor module 212 may also verify that the processor cores of the second processor module 208 are synchronized.

The third processor module 212 may also verify that two of the cores of the second processor module 208 are executing redundant/identical functions that are stored in separate blocks of the memory 344. This verification may be performed, for example, by comparing results determined by two of the cores at a third core and verifying that the third core reports that the comparison of the results indicates that the results are the same.

The third processor module 212 may also verify that the second processor module 208 satisfies serial data transfer requirements for serial data integrity as defined under the ASIL B classification. The third processor module 212 may verify that checksum values calculated based on data stored in memory blocks of non-volatile memory (NVM) of the second processor module 208 are equal to expected checksum values. The third processor module 212 may also perform one or more verifications that are defined under the ASIL B classification. The third processor module 212 may determine that a fault is present in the primary EOCM 152 when one or more of the above are not verified.

When the third processor module 212 identifies a fault in the primary EOCM 152 (e.g., in the first processor module 204 or the second processor module 208), the third processor module 212 sets first and second disabling signals 400 and 404 to an active state. When a fault has not been identified in the primary EOCM 152 by the third processor module 212, the third processor module 212 may set the first and second disabling signals 400 and 404 to an inactive state.

When the first processor module 204 identifies a fault in the primary EOCM 152 (e.g., in the second processor module 208 or the third processor module 212), the first processor module sets third and fourth disabling signals 408 and 412 to an active state. When a fault has not been identified in the primary EOCM 152 by the first processor module 204, the first processor module 204 may set the third and fourth disabling signals 408 and 412 to an inactive state.

The CAN bus disabling module 216 selectively disables communications from the primary EOCM 152 to the CAN bus 140 when the first disabling signal 400 and/or the third disabling signal 408 is in the active state. The CAN bus disabling module 216 may, for example, disable the CAN transceiver(s) 224 when the first disabling signal 400 and/or the third disabling signal 408 is in the active state. The CAN bus disabling module 216 may enable the CAN transceiver(s) 224 when both the first disabling signal 400 and the third disabling signal 408 are in the inactive state. The CAN bus disabling module 216 may enable and disable the CAN transceiver(s) 224 via an enable/disable signal 416.

The FlexRay bus disabling module 220 disables communications from the primary EOCM 152 to the FlexRay bus 144 when the second disabling signal 404 and/or the fourth disabling signal 412 is in the active state. The FlexRay bus disabling module 220 may, for example, disable the FlexRay transceiver 228 when the second disabling signal 404 and/or the fourth disabling signal 412 is in the active state. The FlexRay bus disabling module 220 may enable the FlexRay transceiver 228 when both the second disabling signal 404 and the fourth disabling signal 412 are in the inactive state. The FlexRay bus disabling module 220 may enable and disable the FlexRay transceiver 228 via an enable/disable signal 420.

In this manner, the primary EOCM 152 is prevented from actuating the power steering motor 120, the throttle valve 112, and/or the brakes 124. When a fault is present in the primary EOCM 152, the redundant EOCM 156 may take control of the active safety system and selectively actuate the power steering motor 120, the throttle valve 112, and/or the brakes 124, to supplement the driver inputs 108, to counteract the driver inputs 108, or independent of the driver inputs 108.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system of a vehicle, comprising:
    an engine control module (ECM) that controls engine actuators based on driver inputs to a steering wheel, an accelerator pedal, a brake pedal, and a cruise control system;
    a first processor module that includes a first microprocessor and that selectively actuates at least one of an electric power steering motor, friction brakes, and a throttle valve based on processed data;
    sensors that sense features outside of the vehicle;
    a second processor module that includes a second microprocessor and that generates the processed data based on data from the sensors,
    wherein the second microprocessor is a graphical microprocessor;
    a third processor module that includes a third microprocessor and that generates an indicator of whether a fault is present in the second processor module; and
    an external object calculation module that includes:
        a fourth processor module that includes a fourth microprocessor and that, only in response to an indication that the fault is present in the second processor module, selectively actuates at least one of the electric power steering motor, the friction brakes, and the throttle valve based on second processed data;
        a fifth processor module that includes a fifth microprocessor and that generates the second processed data based on the data from the sensors,
        wherein the fifth microprocessor is a graphical microprocessor; and
        a sixth processor module that includes a sixth microprocessor and that generates an indicator of whether a fault is present in the fifth processor module.

2. The system of claim 1 wherein:
    the first microprocessor includes at least two processor cores; and
    the second microprocessor includes at least four processor cores.

3. The system of claim 1 wherein the second microprocessor operates at a speed of at least 1 Gigahertz (GHz).

4. The system of claim 1 wherein the second microprocessor includes a rating of at least 9600 Dhrystone million instructions per second (DMIPS).

5. The system of claim 1 wherein the third processor module determines whether the fault is present in the second processor module based on whether the second processor module calls functions in a predetermined order.

6. The system of claim 5 wherein the third processor module determines that the fault is present in the second processor module when the second processor module calls functions in an order that is different than the predetermined order.

7. The system of claim 1 wherein the third processor module determines whether the fault is present in the second processor module based on whether the second processor module completes execution of a function within a predetermined period.

8. The system of claim 7 wherein the third processor module determines that the fault is present in the second processor module when the second processor module one of: completes execution of the function in greater than the predetermined period; and does not complete the execution of the function.

9. The system of claim 1 wherein the third processor module outputs a challenge to the second processor module and determines whether the fault is present in the second processor module based on whether the second processor module generates a predetermined response to the challenge.

10. The system of claim 9 wherein the third processor module determines that the fault is present in the second processor module when the third processor module generates a response that is different than the predetermined response.

11. The system of claim 1 wherein:
    the second microprocessor includes at least four processor cores; and
    the third processor module determines that the fault is present in the second processor module when the at least four processor cores are not synchronized.

12. The system of claim 1 wherein:
    the third processor module generates a challenge;
    the second microprocessor includes at least four processor cores;

a first processor core of the at least four processor cores generates a first result based on the challenge;
a second processor core of the at least four processor cores generates a second result based on the challenge;
a third processor core of the at least four processor cores compares the first and second results; and
the first, second, and third processor cores are different cores.

13. The system of claim 12 wherein:
the third processor core indicates whether the first and second results are the same; and
the third processor module determines whether the fault is present in the second processor module based on the indication of whether the first and second results are the same.

14. The system of claim 13 wherein the third processor module determines that the fault is present in the second processor module when the third processor core indicates that the first and second results are not the same.

15. The system of claim 1 wherein:
the fourth microprocessor includes at least two processor cores; and
the fifth microprocessor includes at least four processor cores.

16. The system of claim 1 wherein the fifth microprocessor operates at a speed of at least 1 Gigahertz (GHz).

17. The system of claim 1 wherein the fifth microprocessor includes a rating of at least 9600 Dhrystone million instructions per second (DMIPS).

18. The system of claim 1 wherein, when the fault is present in the second processor module, the third processor module prevents the first processor module from actuating the electric power steering motor, the friction brakes, and the throttle valve.

* * * * *